(12) United States Patent
Anglin et al.

(10) Patent No.: US 8,185,496 B2
(45) Date of Patent: *May 22, 2012

(54) SEPARATING FILE DATA STREAMS TO ENHANCE PROGRESSIVE INCREMENTAL PROCESSING

(75) Inventors: Matthew Joseph Anglin, Tucson, AZ (US); David Maxwell Cannon, Tucson, AZ (US); Barry Fruchtman, Tucson, AZ (US); Avishai Haim Hochberg, San Jose, CA (US); James Patrick Smith, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/858,845

(22) Filed: Aug. 18, 2010

(65) Prior Publication Data

US 2010/0306178 A1    Dec. 2, 2010

Related U.S. Application Data

(63) Continuation of application No. 12/043,819, filed on Mar. 6, 2008, now Pat. No. 7,908,246.

(51) Int. Cl.
*G06F 7/20* (2006.01)
*G06F 17/30* (2006.01)

(52) U.S. Cl. ..................................... 707/625

(58) Field of Classification Search .................. 707/625
See application file for complete search history.

(56) References Cited

U.S. PATENT DOCUMENTS

| | | | | |
|---|---|---|---|---|
| 6,865,655 | B1 * | 3/2005 | Andersen | 711/162 |
| 6,993,539 | B2 * | 1/2006 | Federwisch et al. | 1/1 |
| 7,007,046 | B2 * | 2/2006 | Manley et al. | 707/624 |
| 2003/0018822 | A1 * | 1/2003 | Robb et al. | 709/250 |
| 2008/0275911 | A1 * | 11/2008 | Sandorfi et al. | 707/103 R |

* cited by examiner

*Primary Examiner* — James Trujillo
*Assistant Examiner* — Jorge A Casanova
(74) *Attorney, Agent, or Firm* — Century IP Group, Inc.; F. Jason Far-hadian, Esq.

(57) ABSTRACT

Systems, methods, and computer products for separating file data streams for improved progressive incremental processing are provided. The method comprises identifying data in a file, prior to transmission of the data in a data stream to a second system, such that the second system can distinguish first data from second data in the file. The method further comprises processing the first and second data to determine whether the first or second data has changed, and transmitting the first data to the second system in response to determining the first data has changed, so that the first data is stored in a data storage medium in association with third and fourth data previously stored without replacing the third data and fourth data, wherein the third and fourth data comprise older versions of the first and second data, respectively.

17 Claims, 10 Drawing Sheets

FIG. 3B

```
sending object "filename.filetype"
sending data for file stream type STREAM_TYPE_SECURITY_DATA
sending data
sending data for file stream type STREAM_TYPE_ALTERNATE_DATA
sending data
sending data for file stream type STREAM_TYPE_FILE_DATA
sending data
done sending data
```

FIG. 3C

```
sending object "filename.filetype"
sending data for file stream type STREAM_TYPE_SECURITY_DATA
sending data
sending data for file stream type STREAM_TYPE_ALTERNATE_DATA
done sending data
```

SYSTEM STORAGE CONTENTS AT TIME t0

Logical Grouping of
a0, b0, c0, d0

Logical Grouping of
a0, b1, d0

SEPARATING FILE DATA STREAMS TO ENHANCE PROGRESSIVE INCREMENTAL PROCESSING

CROSS-REFERENCE TO RELATED APPLICATIONS

Pursuant to 35 U.S.C. 120, this application is a continuation of U.S. application Ser. No. 12/043,819, filed on Mar. 6, 2008 and issued as U.S. Pat. No. 7,908,246 on Mar. 15, 2011, the contents of which are incorporated by reference herein in their entirety.

COPYRIGHT & TRADEMARK NOTICES

A portion of the disclosure of this patent document contains material which is subject to copyright protection. Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to network computing environments and, more particularly, to methods, systems, and computer products for communicating between a client and server by separating file data streams for improved progressive incremental processing.

BACKGROUND

In a network backup environment, a client system may backup data to a remote storage device over a network and coordinate the backup with a storage management server. For instance, the International Business Machines (IBM®) Tivoli® Storage Manager product provides software for client and server systems to backup client data (IBM and Tivoli are registered trademarks of IBM). The client transfers files from its file system to the storage management server. The storage management server maintains a backup database having information on files sent to the storage management server.

When a file (i.e., data stream) is sent from the client to the server, there are file attributes (e.g., file size, file modification time, etc.) and ancillary data streams associated with the file (e.g., access control lists, extended attribute streams, generic alternate data streams, etc.) that are sent to the storage management server. The ancillary data streams associated with a file are usually unbounded in size and therefore cannot be stored as attributes in a database. Instead, the ancillary data streams are typically stored in the disk/tape storage. Therefore, these data streams are transmitted within the file's data stream. The placement of the ancillary data streams in the file is arbitrary. That is, the ancillary data streams may be positioned in front of the file data or after the file data during data transmission.

In a progressive incremental backup system, a file object from a client is stored on a server during an initial backup. During a subsequent backup, the file object is not transmitted to the server unless the data, associated streams, or attributes have changed since the previous backup.

In current systems, if file attributes have changed, the file attributes are updated in the server database by overwriting the previous version. Thus, the storage management server only has a copy of the file with the current attributes and there is no way to recover previous instances of the file attributes. Also, if either the file data or an associated stream has changed since the most recent backup, the entire file (attributes, file data and associated streams) is sent to the storage management server. Thus, even if only one associated stream has changed, the file data and associated streams are transmitted in their entirety although only a small number of bytes of data have changed.

The above approach unnecessarily creates another complete instance of the file, even though only a small portion of the file has changed and needs to be updated. This increases storage requirements and may cause an older version of the file to roll off so that earlier recovery points are eliminated.

Additionally, in current systems, in order to recover a small amount of stream information (for example, to recover a corrupted ACL), a restore of the entire file (file data and streams) is required.

Methods and systems are needed that can overcome the aforementioned shortcomings.

SUMMARY

The present disclosure is directed to systems, methods and corresponding products that facilitate communicating between a client and server by separating file data streams to enhance progressive incremental processing.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method of transmitting a data file from a first system to a second system by separating file data streams for enhanced progressive incremental processing is provided. The method comprises identifying data included in the data file, prior to transmission of the data file in a data stream to the second system, such that the second system can distinguish first data from second data in the data file, wherein the first data comprises information stored in the data file as content and the second data comprises information associated with said content. The method further comprises processing the first data and the second data to determine whether the first data or the second data has changed, and transmitting the first data to the second system in response to determining that the first data has changed, so that the first data is stored in a data storage medium coupled to the second system in association with third data and fourth data previously stored in the data storage medium, wherein the third data and the fourth data comprise older versions of the first data and the second data, respectively, and wherein storing the first data in the data storage medium does not replace the third data and fourth data.

In accordance with one embodiment, the second data may be transmitted if the second data has changed. In another embodiment, the method further comprises indicating a restore point to restore a stored data file, wherein the server processes the data to determine whether security controls will be backdated. The server reconstructs and transmits the data file to the client subject to security controls.

In accordance with another embodiment, a storage management system is provided. The storage management system comprises a first system and a second system connected to a network, such that the first system may transmit a data file to the second system. The first system is configured to identify data included in a data file, prior to transmission of the data file in a data stream to the second system, such that the server can distinguish first data from second data in the data file. The first system processes the data to determine whether the data has changed since a previous transmission, and transmits the data file to the second system and stored in the data storage medium only if the data has changed.

In accordance with one aspect of the invention, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

FIGS. 3B and 3C illustrate exemplary pseudo-codes for a client-side communication protocol in accordance with one embodiment.

Features, elements, and aspects of the invention that are referenced by the same numerals in different figures represent the same, equivalent, or similar features, elements, or aspects, in accordance with one or more embodiments.

DETAILED DESCRIPTION OF PREFERRED EMBODIMENTS

The present disclosure is directed to systems and corresponding methods that facilitate communicating between a client and server by separating and identifying file data streams to enhance progressive incremental backup operation.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
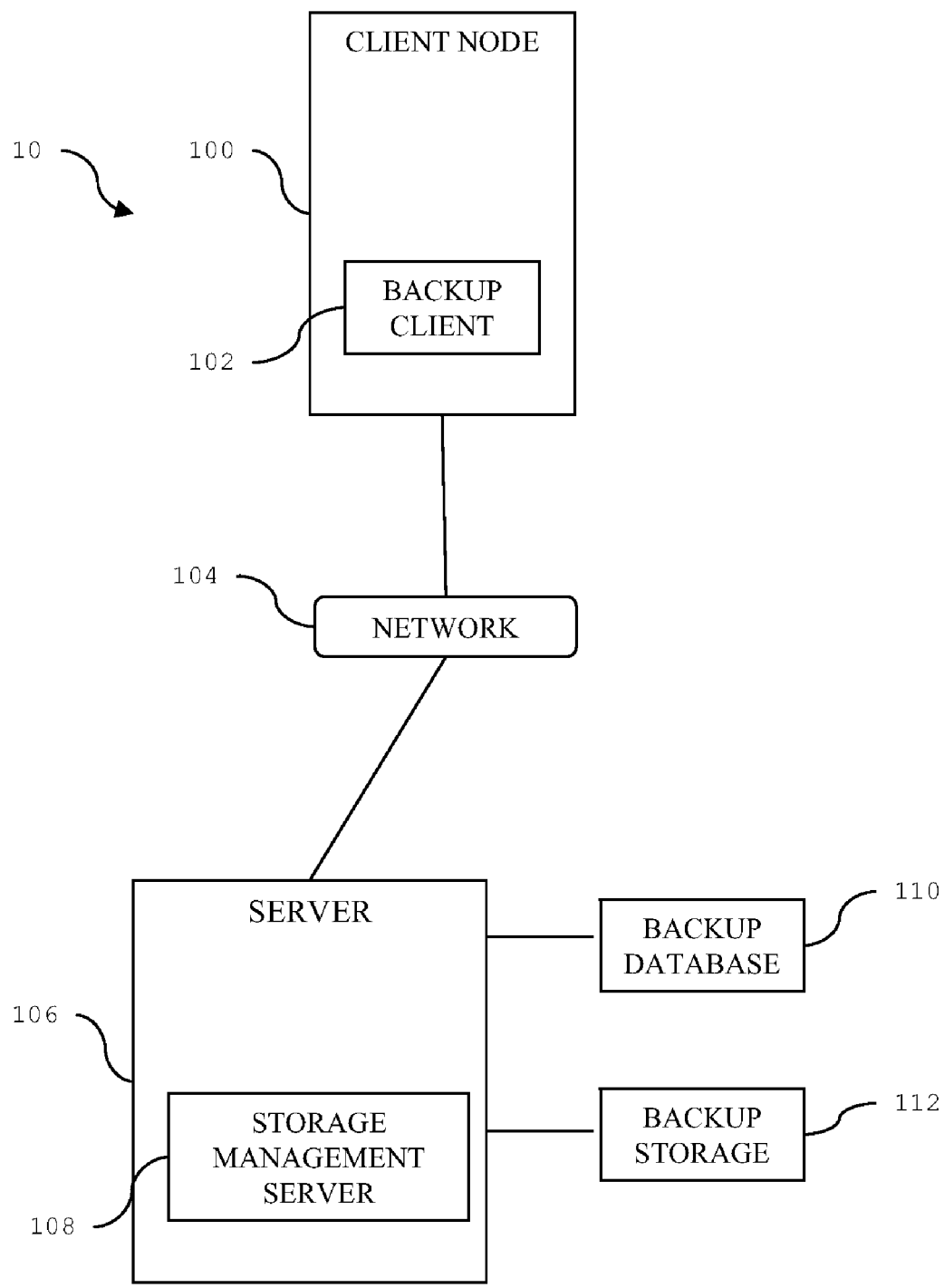
FIG. 1 illustrates a network computing environment in accordance with one or more embodiments.

Referring to FIG. 1, a client node 100 comprises a computing system including a backup client 102 that coordinates backup and archival operations with a storage management server 108. Backup client 102 and storage management server 108 may comprise hardware or logic code executed on server 106 (or the client node 100). The backup client 102 may transfer files from the client node 100 over a network 104 to the storage management server 108. The storage management server 108 may back up or archive client files in a backup storage 112. The storage management server 108 may store other file information associated with the files, such as file metadata or file attributes, in a backup database 110, for example.

One or more client nodes 100 may communicate with the storage management server 108 and may comprise computational devices such as desktop computers, workstations, mainframes, etc. The backup storage 112 may comprise a storage system including a plurality of storage devices, e.g., interconnected hard disk drives, a redundant array of independent disks (RAID), just a bunch of disks (JBOD), a direct access storage device (DASD), disks connected in a loop configuration, a tape library, an optical library, a network attached storage (NAS), etc.

The network 104 may comprise a wide area network (WAN), local area network (LAN), storage area network (SAN), wireless network, interne, intranet, peer-to-peer network, etc. The backup client 102 and storage management server 108 may comprise logic code included with client-server backup programs offered by different vendors (e.g., IBM Tivoli Storage Manager product).

Figure 2:
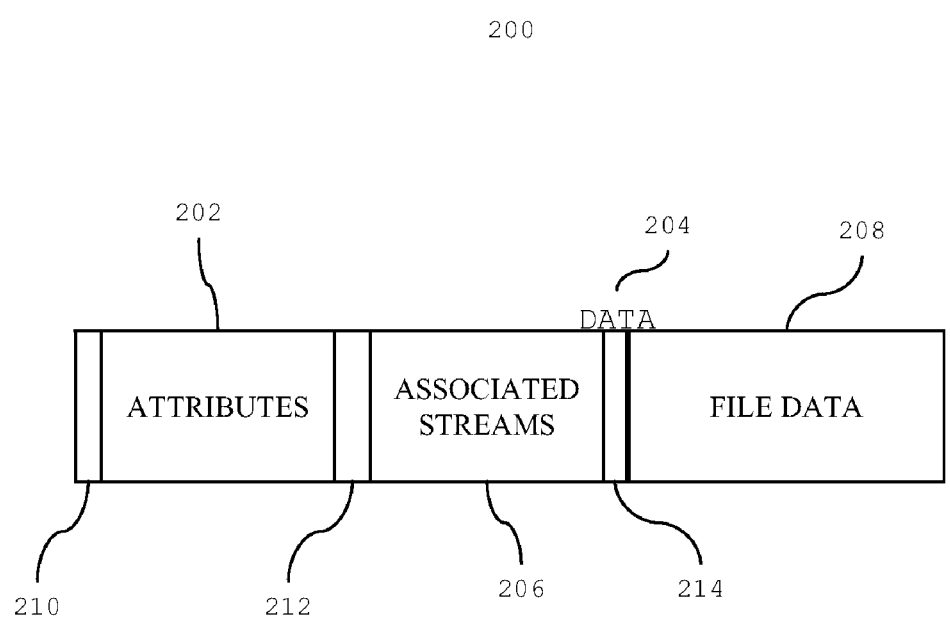
FIG. 2 is a block diagram of an exemplary file data streams in accordance with one or more embodiments.

Referring to FIG. 2, a file object 200 sent from a backup client 102 to a storage management server 108 may comprise file attributes 202 and data 204. The file attributes 202 may comprise a number of different attributes that are associated with the file object 200 (e.g. attributes defining file size, file modification time, file owner, etc.). File attributes 202 may be fixed in size and may be stored in a small, fixed number of bytes. When a file object 200 is sent from a backup client 102 to a storage management server 108, file attributes 202 may be sent and managed separately from the data 204. For example, using a storage management system 10 in accordance with the network computing environment of FIG. 1, file attributes 202 may be stored separately or as metadata in a backup database 110.

In some embodiments, data 204 in the file object 200 may be potentially large and unpredictable in size. Thus, it may be impractical to use a backup database 110 for this information. The data 204 in the file object 200 includes the file data 208 (comprising the actual content of the file object 200), and associated streams 206 (comprising other characteristics and information associated with the file object 200). The associated streams 206 may correspond to access control lists (ACLs), extended attributes (which may contain additional information such as the author's name for a word processing document), or other characteristics that require a large or variable number of bytes. Associated streams 206 for the file object 200 may be unbounded in size and therefore using a database 110 to store the associated streams 206 may be impractical and inefficient.

In one exemplary embodiment, file data 208 comprises the actual content of the file object 200 being sent from a backup client 102 to a storage management server 108. The associated streams 206 are separated from the file data 208, such that file data 208 may be tagged separately for the purpose of identification. Tags 210, 212, are 214 may be embedded in the file data streams transmitted from client 100 to server to identify respective portions of the file object 200.

In the exemplary embodiment in FIG. 2, separating and identifying the associated streams 206 and the file data 208 is conducive to an implementation in which a storage management system 10 may be configured to use the information to provide progressive incremental processing of a file in an efficient manner. In this exemplary progressive incremental processing, recently changed file attributes, file data and associated streams are sent to a storage management server 108. As such, if the noted file attributes, data or streams have not changed since the most recent backup, no or a limited amount of data is sent to the server when a backup process is initiated, in accordance with one embodiment.

Figure 3A:
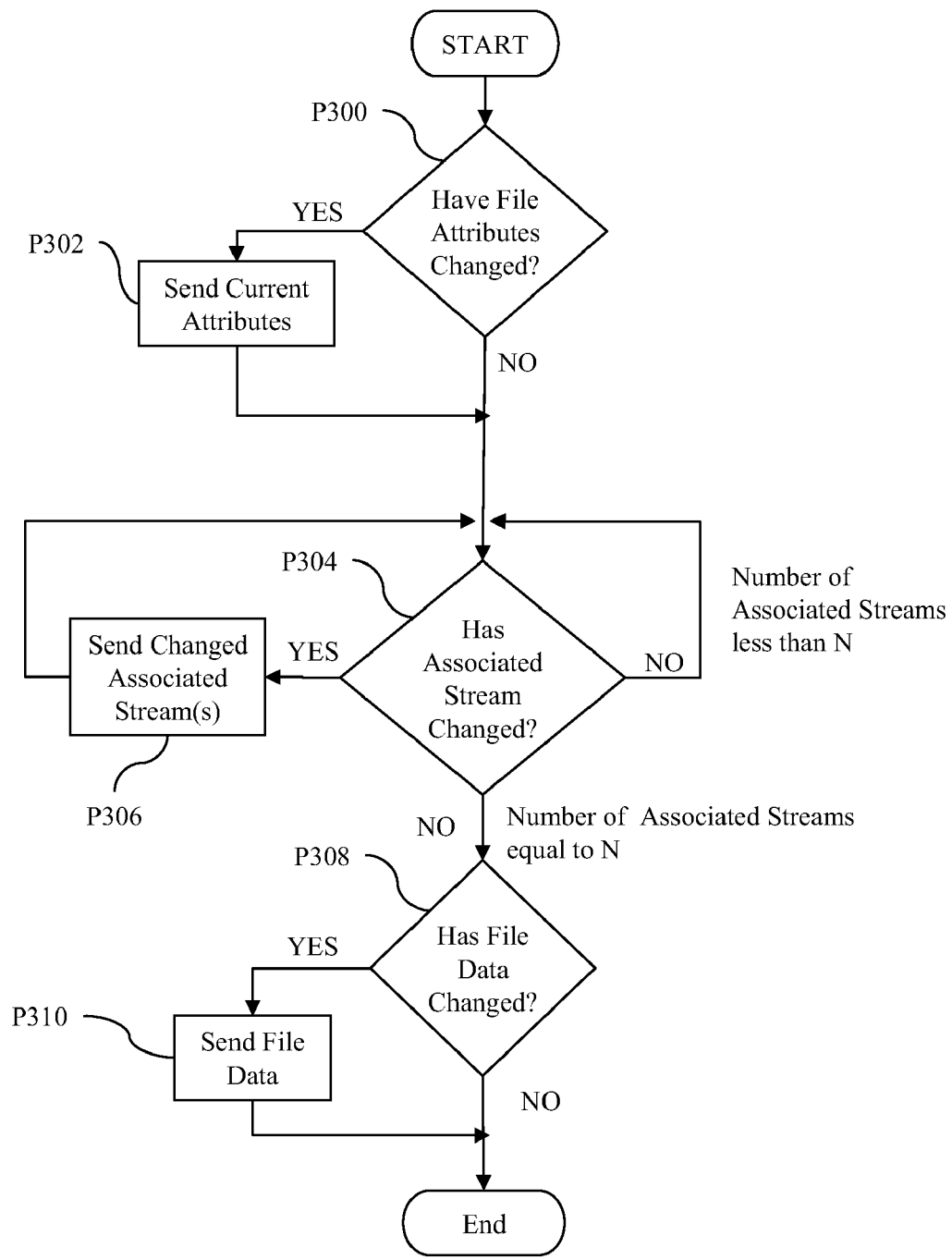
FIG. 3A is a flow diagram of an exemplary client-side communication protocol in accordance with one embodiment.

Referring now to FIG. 3A, an exemplary flow diagram for a client-side communication protocol for a storage management system 10 in accordance with one embodiment is shown. When a backup is initiated, the backup client 102 determines whether the file attributes 202 have changed since the previous backup (P300). If the file attributes 202 have changed, the backup client 102 sends the current file attributes to the storage management server 108 (P302).

The backup client 102 may otherwise determine, for each associated stream 206, whether the stream has changed since the most recent backup (P304). For each associated stream 206 that has changed, the backup client 102 sends the changed associated stream 206 to the storage management server 108 (P306). In an exemplary embodiment, this is iteratively repeated for N number of associated streams 206. The backup client 102 may otherwise determine if any of the file data 208 has changed since the most recent backup (P308). If the file data 208 has changed, the backup client 102 transmits the current version of the file data 208 to the storage management server 108 (P310).

In an exemplary implementation, the backup client 102 identifies to the storage management server 108 the nature of the file data stream being transmitted, so that the storage management server 108 can distinguish between associated streams 206 and file data 208 for better data backup management. Policies for versioning and retention of streams may be different depending on the stream type. The backup client 102 may, for example, indicate the type of file data stream being sent as shown in the exemplary pseudo-code illustrated in FIG. 3B, without limiting the scope of the invention to such exemplary embodiment.

When the file attributes 202 or any associated stream 206 has changed, the backup client 102 may send the changed file attributes 202 or associated streams 206 as shown in the exemplary pseudo-code illustrated in FIG. 3C, without limiting the scope of the invention to such exemplary embodiment.

Figure 4:
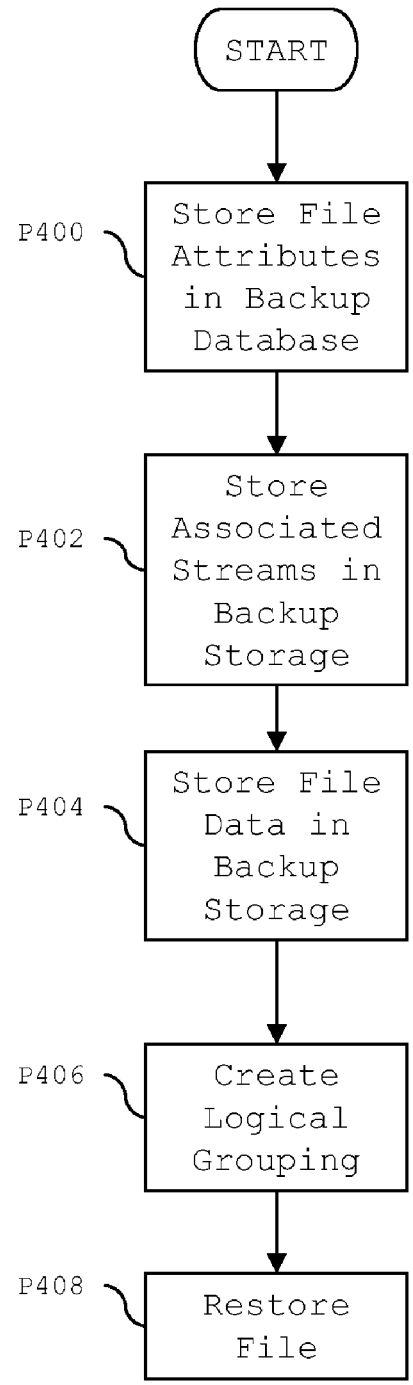
FIG. 4 is a flow diagram of an exemplary server-side implementation for a storage management system in accordance with one embodiment.

Referring now to FIGS. 1, 2 and 4, a storage management server 108 may be configured to manage the associated streams 206 and file data 208 individually, and also be able to transparently reconstruct the complete file object 200 on restore. The storage management server 108 may store any received file attributes 202 in a backup database 110 (P400). The storage management server 108 may also store received associated streams 206 or file data 208 in backup storage 112, for example (P402, P404).

In one implementation, desirably, the storage management server 108 may create a logical grouping of the file attributes 202, associated streams 206, and file data 208 (P406). The storage management server 108 may use the logical grouping to manage and reconstruct the complete file object 200 in order to restore the file (P408). In accordance with one embodiment, the storage management server 108 may keep a table of associations between versions of file data 208 and the various associated streams 206 and file attributes 202. Accordingly, the storage management server 108 may be configured to implement a variety of different policies for retention of different versions of the file attributes 202, associated streams 206, and file data 208.

For example, in one embodiment, the storage management server 108 may be configured to retain associated streams 206 and file attributes 202 in storage as long there is a version of the file data 208 that references them. In an alternative embodiment, the storage management server 108 may be configured to overwrite or delete preexisting data, such that, for example, one instance of the file object 200 is available for restore. The storage management server 108 may be further configured to track versions of file attributes 202 and associated streams 206 separately from file data 208. In one implementation, an exemplary retention policy may allow multiple instances of associated streams 206 to co-exist, regardless of the number of versions of file data 208.

Referring now, for the purpose of example, to FIGS. 1, 2, 3B and 5A, the storage management server 108 may create a logical grouping of the file data 208 with the file attributes 202 and individual associated streams 206 sent from a backup client 102 at a time to. The file attributes 202 (e.g., a0) may be stored in a backup database 110 and other associated streams 206, security data (e.g., b0) and alternate data (e.g., c0), may be stored along with file data 208 (e.g., d0) in backup storage 112. The storage management server 108 may create a first object corresponding to time t0 which comprises a logical grouping of a0, b0, c0, and d0 (even though each element is stored in a different storage medium).

A user on a client 100 machine may modify the file object 200, for instance, by changing the security data (e.g., from b0 to b1) and removing the alternate data (e.g., c0). Referring now to FIGS. 1, 2, 3C and 5B, when a scheduled backup operation is executed at time t1, the backup client 102 determines whether the file data 208 (e.g., d0) has changed. If the file data 208 (e.g., d0) is unchanged, the backup client 102 determines whether the file attributes 202 (e.g., a0) or associated streams 206 have changed. In this example, presuming that the associated streams 206 have changed since the previous backup at time t0, the backup client 102 sends those portions of the file object 200 that have been updated to storage management server 108 for backup purposes. The storage management server 108 may store the associated streams 206 and create a second object corresponding to t1 which comprises a logical grouping of a0, b1 (the new security data), and d0. Since no data was sent with the alternate data stream, the storage management server 108 will not include c0 in the logical grouping.

Figure 6:
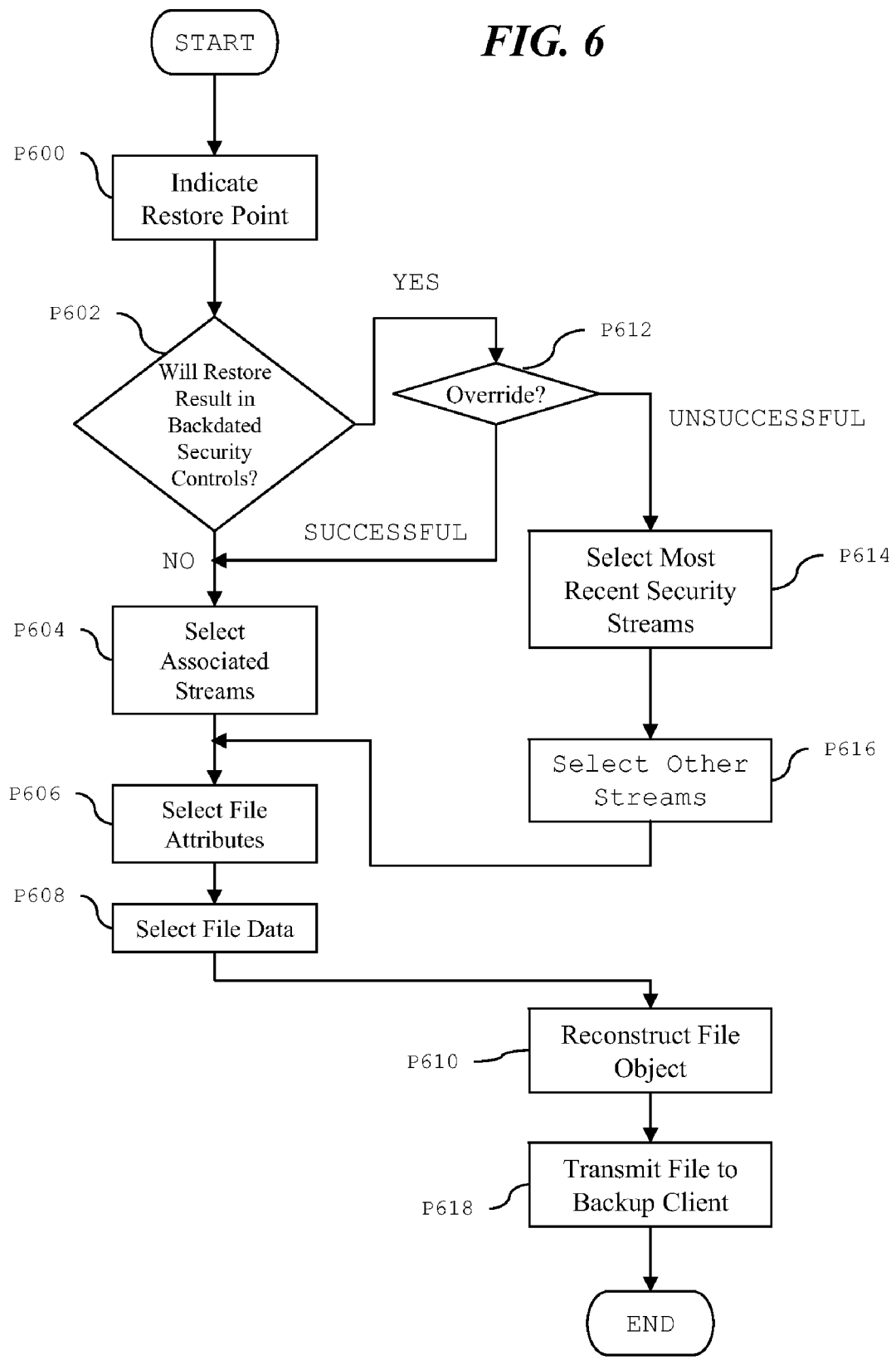
FIG. 6 is a flow diagram of an exemplary restore algorithm in accordance with one embodiment.

Referring now to FIGS. 1, 2 and 6, in an exemplary embodiment, the storage management server 108 is configured to allow associated streams 206 to be restored separately from file data 208, subject to security controls. Restoring a prior instance (backdated or down-level) involving security-related associated streams 206 (i.e., ACLs) may create a security risk. For example, restoring a prior ACL may restore access control to an undesired state by granting access to a user whose access had been deliberately revoked, or by removing access for a user who should have access. In the exemplary embodiment illustrated in FIG. 6, the storage management system provides controls to mitigate this risk.

In accordance with one embodiment, when a restore is initiated, a restore point corresponding to the instance for restore is indicated (P600). For example, referring to FIGS. 5A and 5B, a backup client 102 initiating a restore operation from a storage management server 108 may indicate a restore point based upon the time or date of a previous backup (e.g., time t0). The storage management system 10 then determines whether any security controls will be backdated during the restore of a prior instance (P602). If a restore will result in backdated security controls, the storage management system 10 may be configured to allow restore of such security-related streams if an override is performed (P612). For example, the storage management system 10 may poll for an override by querying a user on a client 100 machine for a security code.

If the override is successful or no security controls will be backdated during the restore, the storage management server 108 selects the associated streams 206, file attributes 202, and file data 208 corresponding to the desired instance (i.e. the logical grouping for the indicated restore point) (P604, P606, P608). The storage management system 10 may then reconstruct the file object 200 comprised of the selected file attributes 202, associated streams 206, and file data (P610). In an exemplary embodiment, the storage management server 108 may reconstruct the file object 200 and transmit the reconstructed file to a backup client 102 (P618). In alternative embodiments, the storage management system 10 may be configured so the storage management server 108 transmits selected attributes 202, associated streams 206, and file data 208 to the backup client 102, such that the backup client 102 reconstructs the file object 200 at the client 100.

In accordance with one embodiment, if the security override is unsuccessful, the storage management server 108 may be configured to select the most recent security-related associated streams 206 and the remaining other associated streams 206 corresponding to the restore point (P614, P616). Desirably, the storage management server 108 selects the file attributes 202 and file data 208 corresponding to the restore point. The storage management system may reconstruct a file comprising the file attributes 202, file data 208, and associated streams 206 corresponding to the restore point subject to the security controls of the most recent backup.

Figure 5A:
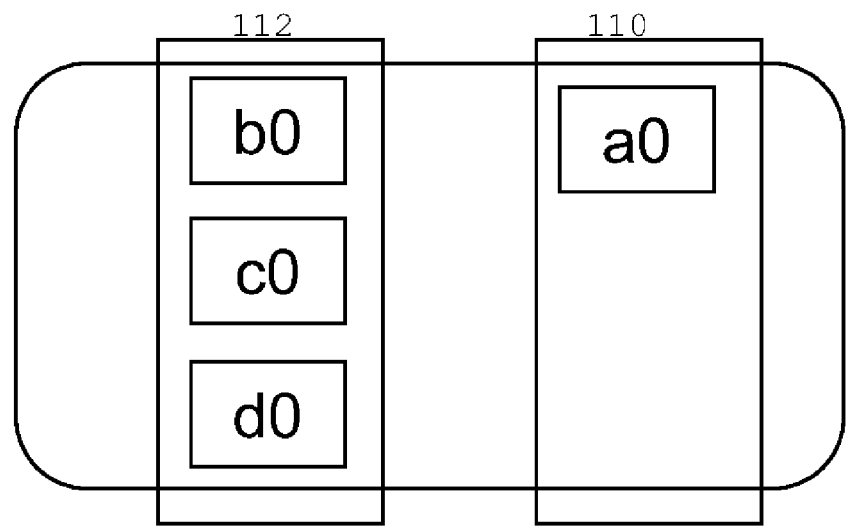
FIGS. 5A and 5B are block diagrams of exemplary file contents being restored in accordance with one embodiment.
Figure 5B:
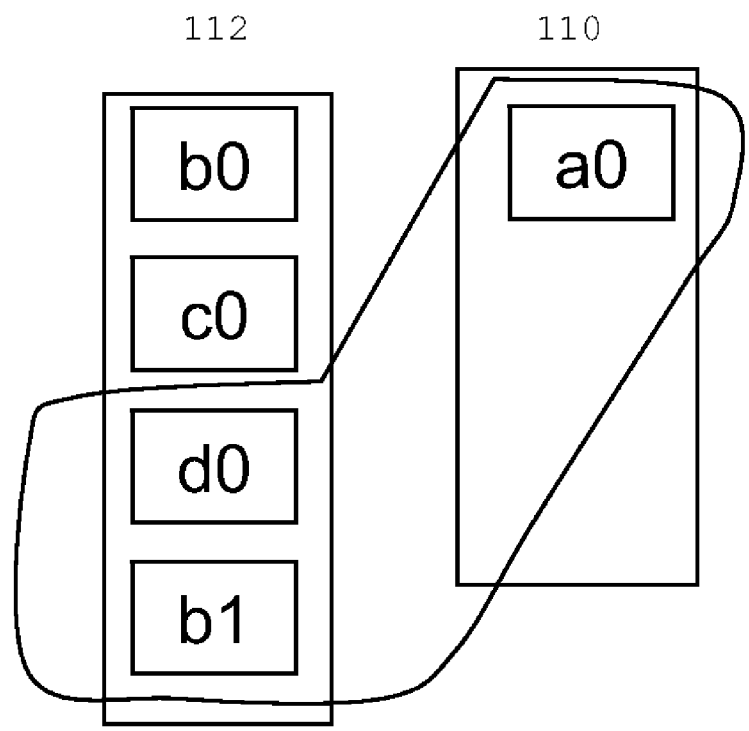

For example, referring to FIGS. 5A, 5B and FIG. 6, a restore to time t0 may result in backdated security controls, because at time t1 the file was updated with new security information b1. If polling was implemented using the exemplary embodiment of FIG. 6 and the override was unsuccessful, a file object 200 comprising a0, b1, c0, and d0 could be reconstructed (P610). In an alternative embodiment, the restore algorithm may be modified to disable any restore, if the security override is unsuccessful.

In another embodiment, the storage management system may be further modified to accommodate the restore of file attributes 202 or an individual associated stream 206 (e.g., to replace a corrupted portion of the file object, to restore streams to a specified point in time, etc.). Thus, a lengthy restore of the entire file object 200 may be avoided.

In an exemplary embodiment, if an associated stream 206 is changed, the entire file object 200 may not be backed up. Likewise, if an associated stream 206 is to be restored, the entire file object 200 may not be restored. This approach reduces or eliminates the prior art burden on network bandwidth and storage space in a storage management system. Certain implementations may also prevent inadvertent data loss of old file versions merely because an associated stream 206 or ancillary part of the data file is updated.

In different embodiments, the invention can be implemented either entirely in the form of hardware or entirely in the form of software, or a combination of both hardware and software elements. For example, clients 100, servers 106, backup clients 102, and storage management servers 108 may comprise a controlled computing system environment that can be presented largely in terms of hardware components and software code executed to perform processes that achieve the results contemplated by the system of the present invention.

Figure 7:
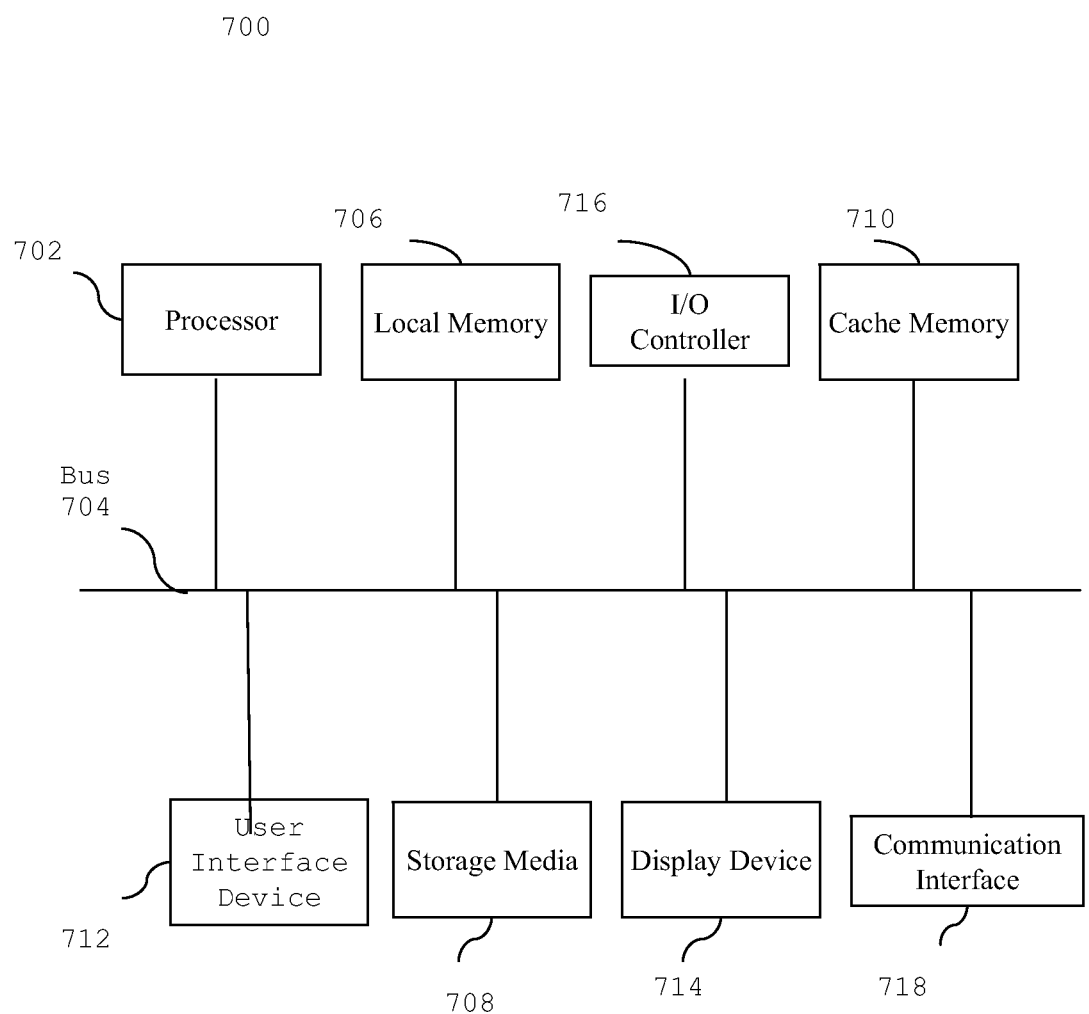
FIGS. 7 and 8 are block diagrams of hardware and software environments in which a system may operate, in accordance with one or more embodiments.
Figure 8:
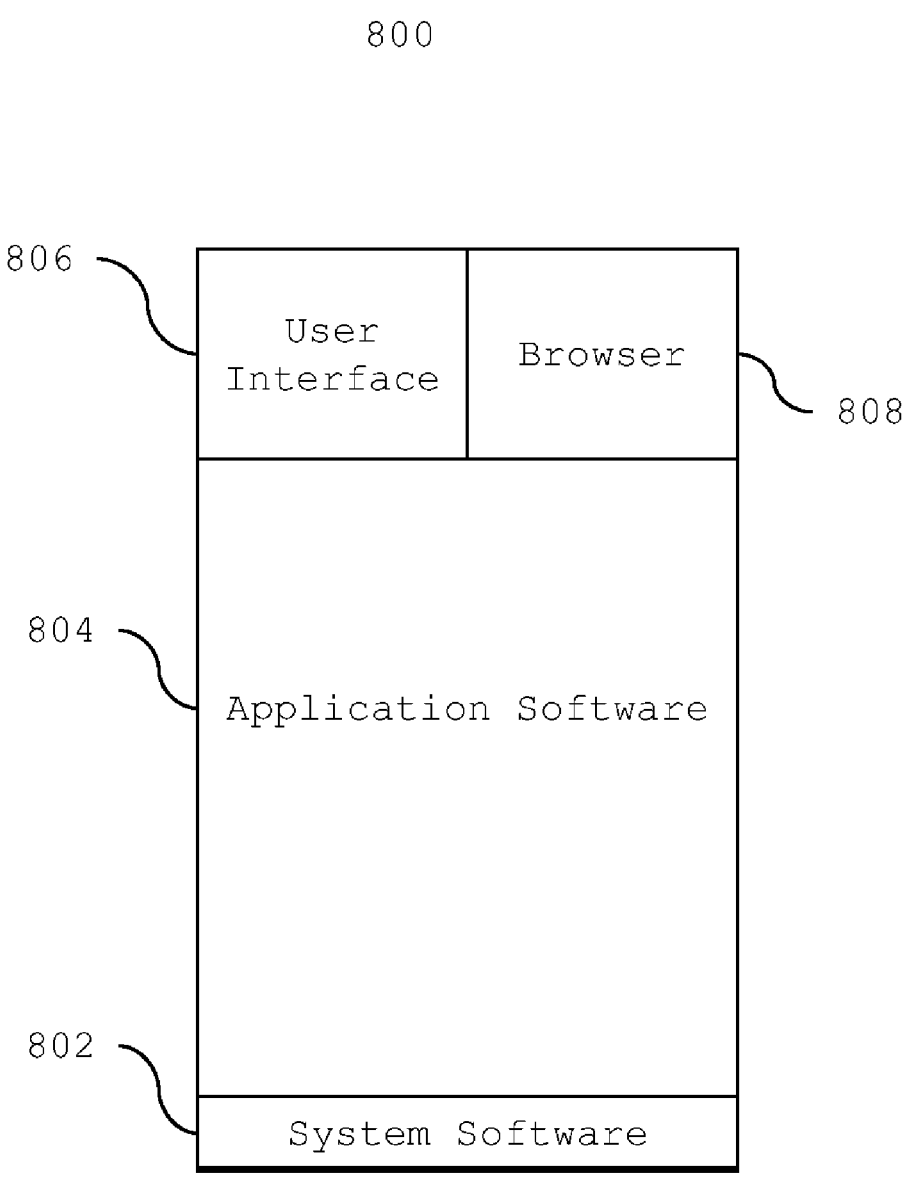

Referring to FIGS. 7 and 8, a computing system environment in accordance with an exemplary embodiment is composed of a hardware environment 700 and a software environment 800. The hardware environment 700 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 800 is divided into two major classes comprising system software 802 and application software 804. System software 802 comprises control programs, such as the operating system (OS) and information management systems that instruct the hardware how to function and process information.

In one embodiment, the backup client 102 and the storage management server 108 may be implemented as system software 802 and application software 804 executed on one or more hardware environments to facilitate data restore and backup among computing systems in a network 104. Application software 804 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 7, an embodiment of the system software 802 and application software 804 can be implemented as computer software in the form of computer readable code executed on a data processing system such as hardware environment 700 that comprises a processor 702 coupled to one or more computer readable media or memory elements by way of a system bus 704. The computer readable media or the memory elements, for example, can comprise local memory 706, storage media 708, and cache memory 710. Processor 702 loads executable code from storage media 708 to local memory 706. Cache memory 710 provides temporary storage to reduce the number of times code is loaded from storage media 708 for execution.

A user interface device 712 (e.g., keyboard, pointing device, etc.) and a display device 714 can be coupled to the computing system either directly or through an intervening I/O controller 716, for example. A communication interface unit 718, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 700 may not include all the above components, or may comprise other components for additional functionality or utility. For example, hardware environment 700 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 718 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 8, system software 802 and application software 804 can comprise one or more computer programs that are executed on top of an operating system after being loaded from storage media 708 into local memory 706. In a client-server architecture, application software 804 may comprise backup client 102 software and storage management server 108 software. For example, in one embodiment of the invention, backup client 102 software is executed on client 100 computing systems and storage management server 108 software is executed on a server 106 system.

Software environment 800 may also comprise browser software 808 for accessing data available over local or remote computing networks. Further, software environment 800 may comprise a user interface 806 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method implemented to run on one or more processors for transmitting a data file from a first system to a second system, the method comprising:

distinguishing first data included in the data file from second data included in the data file, prior to transmission of the data file to the second system;

determining whether the first data or the second data has changed;

transmitting the first data to the second system, in response to determining that the first data has changed, wherein the first data is stored in a data storage medium coupled to the second system in association with third data previously stored in the data storage medium;

transmitting the second data to the second system excluding unchanged portions of the second data, in response to determining that the second data has changed, wherein the second data is stored in the data storage medium in association with fourth data previously stored in the data storage medium, wherein the third data and the fourth data comprise older versions of the first data and the second data, respectively, and wherein storing the first data in the data storage medium does not replace the third data and the fourth data; and indicating a restore point for restoring the first data to a prior version, wherein the second system utilizes the second data and the fourth data to determine whether security controls will be backdated.

2. The method of claim 1, wherein the second system reconstructs the data file comprising the third data and the fourth data, in response to determining that the security controls are not backdated, and wherein the second system transmits the data file to the first system.

3. The method of claim 1, wherein the second system reconstructs a data file comprising the third data and the second data in response to determining that security controls will be backdated, and wherein the second system transmits the data file to the first system.

4. The method of claim 1, wherein the second system restores the fourth data in response to determining that security controls will not be backdated, and wherein the second system transmits the fourth data to the first system.

5. The method of claim 1, wherein the second system restores the second data in response to determining that security controls will be backdated, wherein the second system transmits the second data to the first system.

6. A computer program product for transmitting a data file from a first system to a second system, the computer program product comprising a non-transient computer readable storage medium having computer readable program code stored thereon, wherein the computer readable program code when executed on a computer causes the computer to:

identify data included in the data file, prior to transmission of the data file in a data stream to the second system, such that the second system can distinguish first data from second data in the data file, wherein the first data comprises information stored in the data file as content and the second data comprises information associated with said content;

process the first data and the second data to determine whether the first data or the second data has changed; and transmit the first data to the second system, in response to determining that the first data has changed, so that the first data is stored in a data storage medium coupled to the second system in association with third data and fourth data previously stored in the data storage medium, wherein the third data and the fourth data comprise older versions of the first data and the second data, respectively, and wherein storing the first data in the data storage medium does not replace the third data and the fourth data; and transmitting the second data to the second system excluding unchanged portions of the second data, in response to determining that the second data has changed, wherein the second system processes the second data and fourth data stored in a data storage medium to determine whether security controls will be backdated.

7. The computer program product of claim 6, wherein the second system reconstructs the data file comprising the third data and the fourth data if security controls will not be backdated, and wherein the second system transmits the data file to the first system.

8. The computer program product of claim 6, wherein the second system reconstructs a data file comprising the third data and the second data if security controls will be backdated, and wherein the second system transmits the data file to the first system.

9. The computer program product of claim 6, wherein the second system restores the fourth data if security controls will not be backdated, and wherein the second system transmits the fourth data to the first system.

10. The computer program product of claim 6, wherein the second system restores the second data if security controls will be backdated, and wherein the second system transmits the second data to the first system.

11. A storage management system comprising:

a first system comprising one or more processors communicatively coupled to a network, such that the first system may transmit a data file to a second system communicatively coupled to the network, said first system configured to identify data included in a data file, prior to transmission of the data file in a data stream to the second system, such that the second system can distinguish first data from second data in the data file, wherein the first data comprises information stored in the data file as content and the second data comprises information associated with said content, and wherein the first system processes the first data and the second data to determine whether the first data or the second data has changed, wherein the first system transmits the first data to the second system in response to determining that the first data has changed, such that the second system stores the first data in a data storage medium coupled to the second system in association with third data and fourth previously stored in the data storage medium, wherein the third data and fourth data comprise older versions of the first data and the second data, respectively; and wherein the second system does not replace the third data and fourth data, wherein the second system is configured to restore a file corresponding to an indicated restore point, wherein the second system processes the second data and fourth data stored in a data storage medium to determine whether security controls will be backdated.

12. The storage management system of claim 11, wherein the first system transmits second data to the second system excluding unchanged portions of the second data, in response to determining the second data has changed.

13. The storage management system of claim 11, wherein the second system reconstructs the data file comprising the third data and the fourth data if security controls will not be backdated, and wherein the second system transmits the data file to the first system.

14. The storage management system of claim 11, wherein the second system reconstructs a data file comprising the third data and the second data if security controls will be backdated, and wherein the second system transmits the data file to the first system.

15. The storage management system of claim 11, wherein the second system restores the fourth data if security controls are not to be backdated, and wherein the second system transmits the fourth data to the first system.

16. A method of transmitting a data file from a first system to a second system, the method comprising:

identifying data included in the data file, prior to transmission of the data file in a data stream to the second system, such that the second system can distinguish first data from second data in the data file, wherein the first data comprises information stored in the data file as content and the second data comprises information associated with said content;

processing the first data and the second data to determine whether the first data or the second data has changed;

transmitting the first data to the second system in response to determining that the first data has changed, so that the first data is stored in a data storage medium coupled to the second system in association with third data and fourth data previously stored in the data storage medium, wherein the third data and the fourth data comprise older versions of the first data and the second data, respectively, and wherein storing the first data in the data storage medium does not replace the third data and the fourth data, wherein the second system is configured to restore a file corresponding to an indicated restore point, wherein the second system processes the second data and fourth data stored in a data storage medium to determine whether security controls will be backdated.

17. The method of claim 16, wherein the first data and the second data are transmitted from the first system to the second system in separate data streams.

* * * * *